(12) United States Patent
Basten

(10) Patent No.: US 7,866,688 B2
(45) Date of Patent: Jan. 11, 2011

(54) AIRBAG MODULE FOR A MOTOR VEHICLE

(75) Inventor: Silvan Basten, Messel (DE)

(73) Assignee: Takata Petri AG, Aschaffenburg (DE)

( * ) Notice: Subject to any disclaimer, the term of this patent is extended or adjusted under 35 U.S.C. 154(b) by 0 days.

(21) Appl. No.: 12/320,119

(22) Filed: Jan. 16, 2009

(65) Prior Publication Data

US 2009/0194983 A1 Aug. 6, 2009

Related U.S. Application Data

(63) Continuation of application No. PCT/EP2007/056103, filed on Jun. 20, 2007.

(30) Foreign Application Priority Data

Jul. 18, 2006 (DE) .................. 10 2006 033 895

(51) Int. Cl.
B60R 21/16 (2006.01)
B60R 21/233 (2006.01)
(52) U.S. Cl. .................... 280/729; 280/743.1
(58) Field of Classification Search .......... 280/728.1, 280/729, 728.3, 743.1, 743.2
See application file for complete search history.

(56) References Cited

U.S. PATENT DOCUMENTS

| | | | | |
|---|---|---|---|---|
| 5,096,222 A | * | 3/1992 | Komerska et al. | 280/732 |
| 5,195,775 A | * | 3/1993 | Komerska et al. | 280/732 |
| 6,616,587 B2 | * | 9/2003 | Kleeberger et al. | 493/457 |
| 7,213,837 B2 | * | 5/2007 | Clarke et al. | 280/731 |
| 7,648,157 B2 | * | 1/2010 | Miwa et al. | 280/728.2 |
| 7,669,882 B2 | * | 3/2010 | Karlow et al. | 280/728.2 |
| 2002/0135160 A1 | | 9/2002 | Lorenz | |
| 2004/0207181 A1 | * | 10/2004 | Hayashi et al. | 280/728.3 |
| 2006/0125215 A1 | | 6/2006 | Clarke et al. | |
| 2007/0112887 A1 | | 5/2007 | Liu et al. | |
| 2008/0111351 A1 | | 5/2008 | Eckert et al. | |

FOREIGN PATENT DOCUMENTS

| | | |
|---|---|---|
| DE | 91 01 099 U1 | 6/1992 |
| DE | 101 14 208 A1 | 5/2002 |
| DE | 20 2005 011 878 U1 | 11/2005 |
| DE | 20 2006 005 319 U1 | 7/2006 |
| WO | WO 2007/112887 A1 | 10/2007 |

OTHER PUBLICATIONS

Annotated Definition of "Defining" from Merriam-Webster's Online Dictionary, available at http://www.merriam-webster.com/dictionary/defining (last visited Aug. 25, 2010).*

* cited by examiner

*Primary Examiner*—Paul N Dickson
*Assistant Examiner*—Joseph Rocca
(74) *Attorney, Agent, or Firm*—Foley & Lardner LLP

(57) ABSTRACT

An airbag module for a motor vehicle, the modeling including an airbag, that may be inflated with gas to protect a person, and a protective envelope enclosing the airbag in a gas-tight manner. The protective envelope is formed at least partially from a flexible protective film. The protective film comprises a gas-tight weakened region, along which the protective film tears open when the airbag presses against the protective film during inflation. The weakened region is configured to be bag-shaped in cross section by stretching the protective film.

15 Claims, 2 Drawing Sheets

AIRBAG MODULE FOR A MOTOR VEHICLE

CROSS-REFERENCE TO RELATED PATENT APPLICATIONS

This application is a Continuation of International Patent Application No. PCT/EP2007/056103, filed Jun. 20, 2007, which was published in German as WO/2008/009532 A1 and is incorporated herein by reference in its entirety.

BACKGROUND

The present disclosure relates to an airbag module for a motor vehicle and a method for producing such an airbag module. Such an airbag module generally includes an airbag, which may be inflated with gas to protect a person as well as a protective envelope enclosing the airbag in a gas-tight manner, which is formed at least partially from a flexible, foldable protective film.

It would be advantageous to provide an airbag module as well as a method for producing an airbag module of the aforementioned type with an improved protective envelope.

SUMMARY

One disclosed embodiment relates to an airbag module for a motor vehicle. The airbag module includes an airbag, that may be inflated with gas to protect a person, and a protective envelope enclosing the airbag in a gas-tight manner. The protective envelope is formed at least partially from a flexible protective film. The protective film comprises a gas-tight weakened region, along which the protective film tears open when the airbag presses against the protective film during inflation. The weakened region is configured to be bag-shaped in cross section by stretching the protective film.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION

Figure 1:
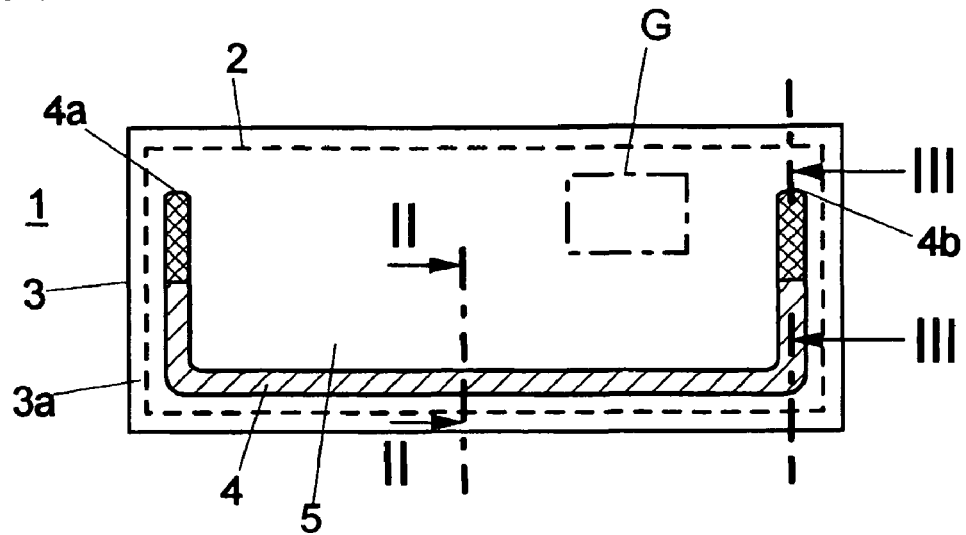
FIG. 1 shows a schematic plan view of an airbag module with an airbag enclosed by a protective envelope in the form of a protective film, the protective film having a U-shaped weakened region.

According to an exemplary embodiment, an airbag module comprises an airbag, which may be inflated with gas to protect a person as well as a protective envelope enclosing the airbag in a gas-tight manner, which is formed at least partially from a flexible, foldable protective film.

According to an exemplary embodiment, the protective film comprises a gas-tight weakened region, along which the protective film is opened when the airbag presses against the protective film during inflation. As the protective film tears open in a predefinable manner along the weakened region during inflation of the airbag, undefined tearing and/or separation of parts of the protective film is prevented. Preventing undefined tearing and/or separation improves the reproducibility of the inflation process of the airbag.

The gas impermeability of the weakened region (the weakened region forms a gas barrier at the same time) prevents a penetration of gases via the weakened region into the protective envelope, ensuring the gas impermeability of the protective envelope before the inflation of the airbag.

It is particularly preferred that the weakened region is configured integrally with the protective film, the protective film preferably being formed by the weakened region and a second region surrounding the weakened region. The second region has a greater thickness in cross section than the weakened region.

The weakened region configured in such a manner is advantageously of simple construction and may accordingly be produced in a simple manner. For example, the weakened region may be formed by deforming the protective film by means of a deep-drawing process.

Preferably, the weakened region is of elongate configuration, extending in one embodiment preferably along a curved path which is, in particular, of U-shaped configuration. The weakened region accordingly has two free ends. The thickness in cross section of the weakened region preferably increases monotonously from a minimum thickness (e.g., the thickness of the majority of the weakened region) up to the thickness of the second region toward the free ends of the weakened region. The second region is dimensioned such that it does not tear open if forces act on it during inflation of the airbag. In this manner, an undefined further tearing of the weakened region beyond the free ends of the weakened region is advantageously prevented in a controlled manner. The continuous increase in the thickness of the weakened region to the value of the thickness of the second region of the protective film surrounding the weakened region gradually increases the force that counteracts further tearing (in a controlled manner).

Depending on the technique with which the weakened region is incorporated into the protective film, a boundary region surrounding the weakened region exists, in which the thickness of the weakened region increases up to the thickness of the second region surrounding the weakened region and the boundary region. In this case, however, there is a substantially smaller increase in thickness per unit of length of the weakened region toward the free ends of the weakened region.

In the present case, the thickness of the weakened region and/or of the second region of the protective film relates to the thickness of the cross section of the protective film, i.e. the thickness in a direction which is respectively located perpendicular to the imaginary surface which is spanned by the protective film. By providing a weakened region with a thickness that is less than the thickness of the second region in cross section, the protective film during inflation of the airbag tears in a predefinable manner along the weakened region. In one embodiment, the extent of the thickness of the second region is substantially uniform and, in particular, is within the range of 70 to 200 μm. In a further embodiment, the thickness of the second region alters and thus varies in the range of 70 to 200 μm. By such a variation of the cross-sectional thickness of the second region the expansion behavior of the protective film may be advantageously controlled during inflation. Relative to the thickness of the second region, the weakened region preferably has a thickness of 50 μm or less in cross section.

According to another exemplary embodiment, the weakened region has a bag-shaped configuration in cross section. Such a configuration of the weakened region may be produced, for example, by stretching the protective film, for example by deep-drawing. The weakened bag-shaped region may be folded toward the second region of the protective film so that, bearing against the second region, said weakened region is arranged between the protective film and the airbag located thereunder.

The protective film itself is preferably constructed in a single layer and preferably comprises a plastics material (e.g., a thermoplastic material). This permits a simple deformation of the protective film to form the weakened region.

Preferably, the protective envelope enclosing the airbag in a gas-tight manner is entirely configured as a protective film. Moreover, the protective film is preferably evacuated, so that it bears closely against the airbag. The airbag may in this case be folded to form an airbag unit. The compact shape of the airbag unit is maintained by evacuating the protective envelope surrounding the airbag. In the present application, evacuating the protective envelope includes providing a pressure in the protective envelope which is substantially lower than the pressure in the external space surrounding the protective envelope.

According to another exemplary embodiment, the protective envelope may be formed partially by a housing-like envelope and partially by a protective film. In this case, the protective film may seal a top surface of the housing-like envelope. The housing-like envelope may be configured to be elastically deformable. In the event that the protective envelope is entirely configured as a protective film, a module housing may be provided which at least partially surrounds the airbag and the protective film.

According to an exemplary embodiment, a method for producing an airbag module may comprise the following steps. In a first step, a protective envelope for encasing an inflatable airbag in a gas-tight manner is provided. The protective envelope serves to protect a person and is formed at least partially from a flexible protective film. In a second step, a gas-tight weakened region is formed on the protective film. Preferably, the weakened region is configured by deforming or stretching the protective film, and namely such that the weakened region in cross section has a smaller thickness than a second region surrounding the weakened region.

According to one exemplary embodiment, a deep-drawing operation is employed to deform and/or stretch the protective film to form the weakened region. Two dies may be used for deep-drawing the protective film, of which one has a positive shape and the other has a corresponding negative shape, so that the weakened region is of bag-shaped configuration in cross section after shaping. One die has a positive shape that forces (deep-draws) the protective film into the negative shape of the second die, stretching and forming the weakened region. According to another exemplary embodiment only one die may be used to form the weakened region. A vacuum may draw the protective film into the negative shape of an individual die, forming a weakened region with a bag-shaped cross section.

In order to achieve a small compact unit, the weakened region of bag-shaped configuration in cross section is preferably folded toward the second region of the protective film.

According to another exemplary embodiment of a method for producing an airbag module, the airbag is encased in a gas-tight manner with the protective envelope, after forming the weakened region. Alternatively, the airbag may also be encased with the protective envelope, before forming the weakened region. In this case, the weakened region is drawn into a negative shape of a deep-drawing die, for example by means of a vacuum, which projects the deformed weakened region into the external space surrounding the protective envelope and naturally may also be folded onto the second region of the protective envelope.

Preferably, the airbag is assembled to form an airbag unit before being encased by the protective envelope and/or protective film. In the event that the protective envelope is entirely constructed from a protective film, in particular a plastics film, the airbag is preferably welded into the protective envelope.

Preferably, the protective envelope is evacuated after encasing the airbag with the protective envelope, so that the protective envelope bears closely against the airbag (airbag unit), whereby an advantageously small compact unit is achieved.

FIG. 1 shows a schematic plan view of an airbag module 1 comprising an airbag 2, that is enclosed in a gas-tight manner by a protective envelope in the form of a protective film 3. The airbag 2 is indicated in FIG. 1 by a dotted line. A gas generator G is provided (indicated in FIG. 1 by a dash-dotted line) for inflating the airbag 2. The gas generator G is preferably arranged in an interior of the airbag 2 surrounded by the airbag 2. The gas generator G may be a cold gas generator in which a gas is stored which is released when the gas generator G is ignited, or it may be a so-called hot generator which contains chemical substances and/or compounds which, after igniting the gas generator G, generate the gas to be released. It is also possible to configure the gas generator G as a hybrid gas generator in which, on the one hand, the gas is stored and which, on the other hand, contains a chemical compound for generating additional hot gases. The gas generator G may be electrically ignited via an electrical cable connected to the igniter of the gas generator G.

If the gas generator G is ignited, the airbag 2 expands as a result of filling the airbag 2 with gas and presses against the protective film 3 from the interior surrounding the protective film 3. On an upper face 3a of the protective film 3 facing a vehicle occupant to be protected, a U-shaped, elongate weakened region 4 is provided. The upper face 3a of the protective film 3 tears open along this weakened region 4 when the airbag 2 presses against the upper face 3a of the protective film 3 during inflation so that the protective film 3, as a result, does not tear open in an uncontrolled manner.

The weakened region 4 is formed in this case by a region of the protective envelope 3, which in comparison with a second region defining the weakened region 4, has in cross section a thickness D', which is less than a thickness D of the second region 5 of the protective film 3. Depending on the material used for the protective film 3, the thickness D' of the weakened region 4 is dimensioned such that the protective film 3 tears open (in a U-shaped manner) along the weakened region 4, when the airbag 2 presses against the upper face 3a of the protective film 3 with a force which is above a threshold force corresponding to the thickness D' of the weakened region 4. The thickness D of the second region 5 is in this case at least sufficiently great that the tearing open of the weakened region 4 may not spread to the second region 5.

Due to the U-shaped configuration of the weakened region 4, the part of the upper face 3a of the protective film 3 defined by the weakened region 4 after the tearing open of the protective film 3 along the weakened region 4 forms a (flexible) flap which is pivotable toward the external space.

In FIG. 1 the protective film 3 encases the airbag 2 entirely, the airbag 2 preferably being welded into the protective film 3. It is, however, also possible that the protective envelope 3 of the airbag module 1 is formed from a partially housing-like envelope, only the upper face 3a of the protective envelope 3 being configured from a protective film, which seals the housing-like envelope of the protective envelope 3, and namely a top surface of the housing-like envelope.

Figure 2:
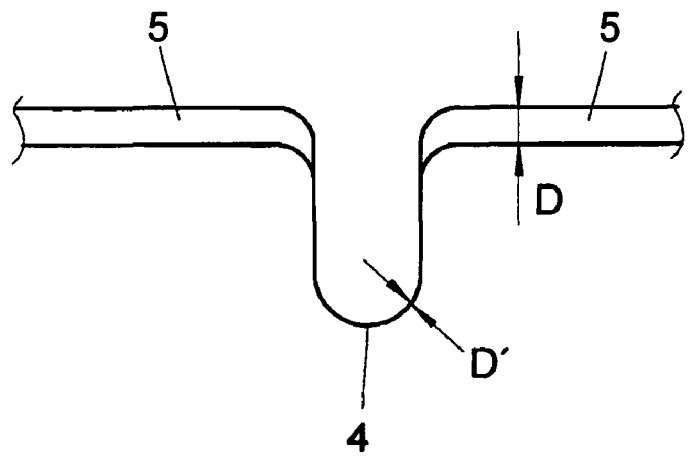
FIG. 2 shows a section along the line II-II of FIG. 1, before folding the weakened region which is bag-shaped in cross section toward the protective film.
Figure 2A:
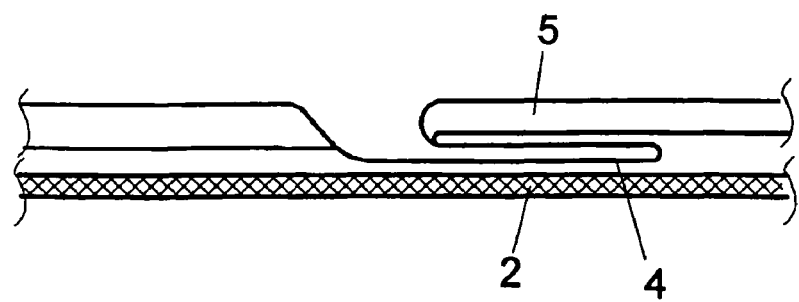
FIG. 2*a* shows a section along the line II-II of FIG. 1.

FIG. 2 shows a schematic sectional view along the line II-II of FIG. 1. Accordingly, the weakened region 4 configured on the upper face 3a of the protective film 3 is of bag-shaped configuration in cross section. When the construction of the airbag module 1 is complete, this weakened region 4 of bag-shaped configuration may project into the external space surrounding the airbag module 1 or may, according to FIG. 2a, be folded toward the second region 5 of the protective film 3, so that—ensuring a small compact unit—said weakened region is arranged between a layer of the airbag 2 and the second region 5 of the protective film 3. The weakened region bears closely both against the second region 5 and against the layer of the airbag 2.

Figure 3:
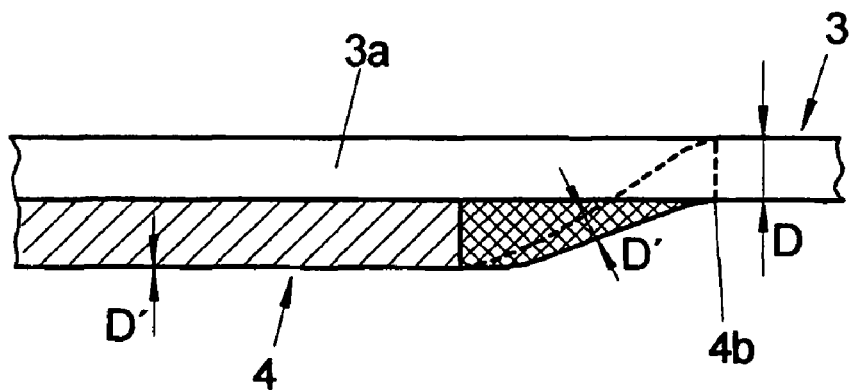
FIG. 3 shows a section along the line III-III of FIG. 1 before folding the weakened region toward the protective film.
Figure 4:
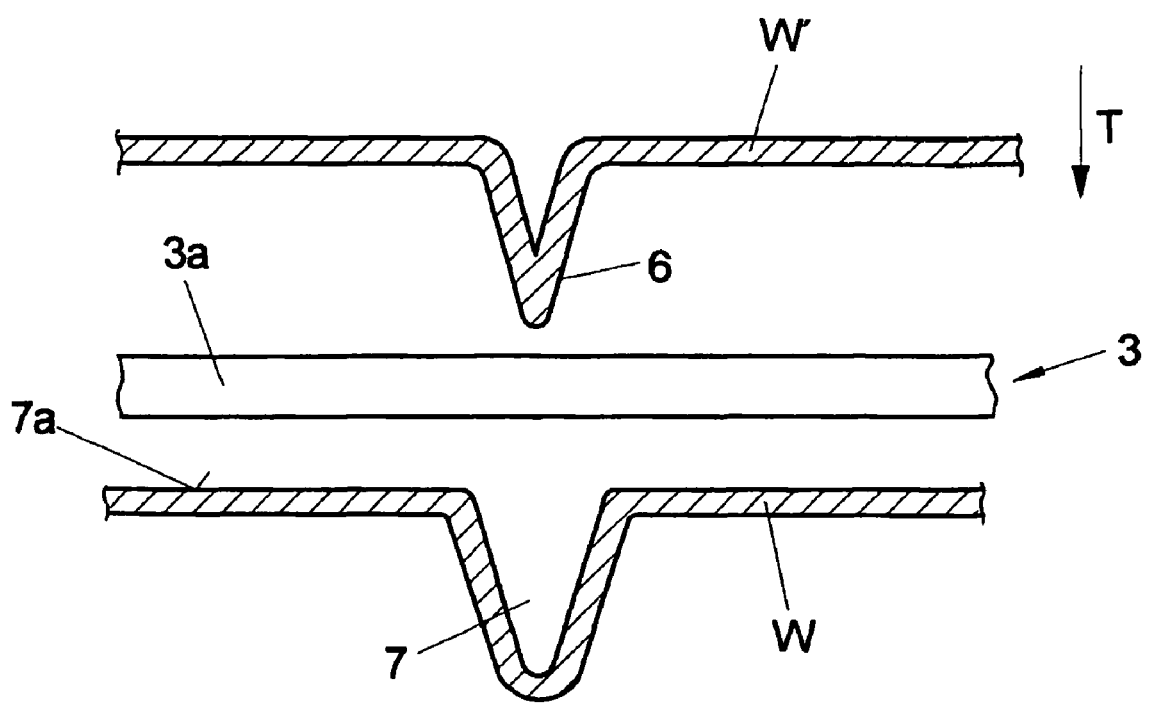
FIG. 4 shows a schematic cross-sectional view of a deep-drawing process for forming a weakened region, which is bag-shaped in cross section, on the protective film of the airbag module.

FIG. 4 shows schematically the production of a weakened region 4 according to FIGS. 1 to 3. In this case, the protective film 3 is positioned relative to a first die W, such that the surface 3a masks a negative shape 7 of the first die W in the form of a recess extending in a U-shaped manner along the first die W. The upper face 3a of the protective film 3 is arranged under pretension on an inner face 7a of the first die W facing the upper face 3a, so that the upper face 3a tightly covers the negative shape 7. For forming the weakened region 4 on the upper face 3a of the protective film 3, a second die W' with a positive shape 6 corresponding to the negative shape 7 is now pushed forward from one side of the upper face 3a remote from the first die W in a first direction T, which extends transversely to the surface 3a. The positive shape 6 is pushed against the tightly clamped upper face 3a, until the positive shape 6 fills up the negative shape 7 by the interposition of a region of the upper face 3a which now forms the weakened region 4. This deep-drawing method is naturally not only restricted to U-shaped weakened regions 4; other profiles of the weakened region 4 are also able to be produced. In the event that only a single (first) die W is intended to be used, a vacuum may be provided in the negative shape 7, which draws a region of the upper face 3a of the protective film 3 into the negative shape 7 until said region—forming the weakened region 4—entirely lines the negative shape 7.

The thickness D' of the weakened region 4 in cross section increases toward the two free ends 4a, 4b of the weakened region 4. The gradually increased thickness reduces the likelihood that the U-shaped weakened region 4 will tear open beyond its free ends 4a, 4b (along the two free limbs of the U-shaped weakened region 4). Accordingly, the bag shape of the weakened region 4, according to the cross section of the weakened region 4 shown in FIG. 3, decreases along the line III-III of FIG. 1 toward the two free ends 4a, 4b of the weakened region 4.

The production of the weakened region 4 according to the method shown schematically in FIG. 4 may be used to control the thickness D' of the weakened region 4 toward the free ends 4a, 4b. The depth of the negative shape 7 in the first direction T, and corresponding to the extent of the positive shape 6 in the first direction T, is continuously reduced to zero at the portions of the negative shape 7 and/or of the positive shape 6 associated with the free ends 4a, 4b of the weakened region 4.

The parts (regions) of the first and second die W, W' coming into contact with the protective film 3 during the deep drawing process and during the handling of the protective film 3 are configured to be smooth (e.g., without sharp-edges) in order to avoid damage to the protective film 3 during production or during subsequent handling (removal of the protective film 3 from the dies W, W').

The priority application, German patent application No. 10 2006 033 895.2, filed Jul. 18, 2006, including the specification, drawings, claims and abstract, is incorporated herein by reference in its entirety.

Given the disclosure of the application, one versed in the art would appreciate that there may be other embodiments and modifications within the scope and spirit of the application. Accordingly, all modifications attainable by one versed in the art from the present disclosure within the scope and spirit of the present application are to be included as further embodiments of the present application.

What is claimed is:

1. An airbag module for a motor vehicle comprising:
   an airbag configured to be inflated with gas to protect a person, and
   a protective envelope enclosing the airbag in a gas-tight manner, and that is formed at least partially from a flexible protective film,
   wherein the protective film includes a gas-tight weakened region and a second region defining the weakened region,
   wherein the protective film is configured to tear open along the weakened region when the airbag presses against the protective film during inflation,
   wherein the weakened region is configured to be bag-shaped in cross section by stretching the protective film, and has a smaller thickness in cross section than the second region, and
   wherein the weakened region projects away from the airbag or is at least partially folded toward the second region.

2. The airbag module as claimed in claim 1, wherein the weakened region is configured integrally with the protective film.

3. The airbag module as claimed in claim 1, wherein the weakened region is of elongate configuration.

4. The airbag module as claimed in claim 1, wherein the weakened region is of U-shaped configuration.

5. The airbag module as claimed in claim 4, wherein the weakened region has two free ends.

6. The airbag module as claimed in claim 5, wherein the thickness of the weakened region increases toward the free ends of the weakened region.

7. The airbag module as claimed in claim 1, wherein the extent of the thickness of the second region is uniform and, is in a range of 70 to 200 micrometers.

8. The airbag module as claimed in claim 1, wherein the extent of the thickness of the second region varies in a range of 70 to 200 micrometers.

9. The airbag module as claimed in claim 1, wherein the thickness of the weakened region is 50 micrometers or less.

10. The airbag module as claimed in claim 1, wherein the weakened region is at least partially folded toward the second region.

11. The airbag module as claimed in claim 1, wherein the protective film is configured in a single layer.

12. The airbag module as claimed in claim 1, wherein the protective film consists of a thermoplastic material.

13. The airbag module as claimed in claim 1, wherein the protective envelope is entirely formed from the protective film.

14. The airbag module as claimed in claim 1, wherein the protective envelope is evacuated.

15. An airbag module for a motor vehicle comprising:

an airbag configured to be inflated with gas to protect a person, and a protective envelope enclosing the airbag in a gas-tight manner, and that is formed at least partially from a flexible protective film, wherein the protective film includes a gas-tight weakened region, wherein the protective film is configured to tear open along the weakened region when the airbag presses against the protective film during inflation, wherein, before inflation of the airbag, the weakened region is configured to be bag-shaped in cross section by stretching the protective film;

wherein the protective film further includes a second region defining the weakened region, the weakened region having a smaller thickness in cross section than the second region; and wherein the weakened region is at least partially folded toward the second region or projects away from the airbag.

* * * * *